(Model.)
D. F. CRIPPEN.
COVER FOR MILK CANS.
No. 324,539. Patented Aug. 18, 1885.
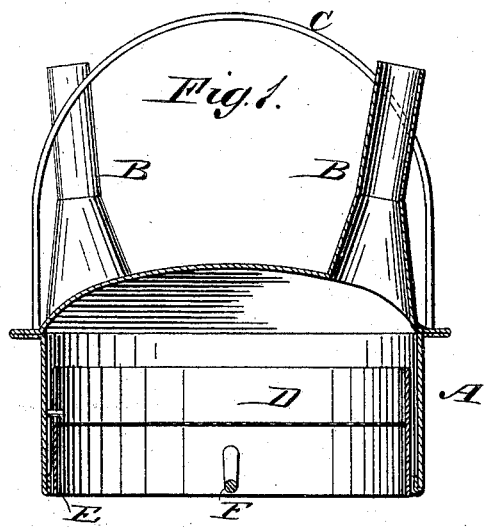
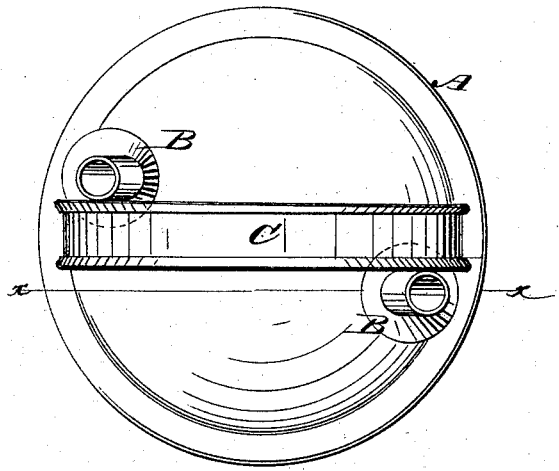
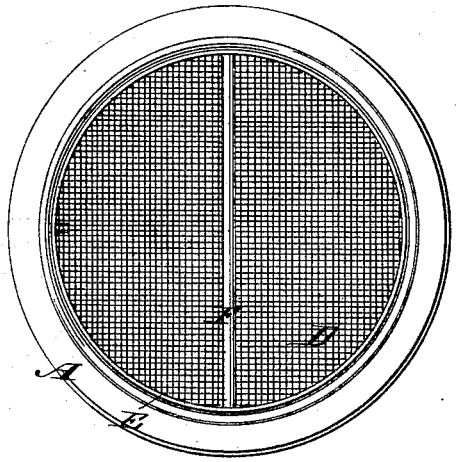
WITNESSES:
INVENTOR:
D. F. Crippen
BY Munn & Co.
ATTORNEYS.

United States Patent Office.

DANIEL F. CRIPPEN, OF RIVERSIDE, CALIFORNIA.

COVER FOR MILK-CANS.

SPECIFICATION forming part of Letters Patent No. 324,539, dated August 18, 1885.

Application filed December 10, 1884. (Model.)

*To all whom it may concern:*

Be it known that I, DANIEL F. CRIPPEN, of Riverside, in the county of San Bernardino and State of California, have invented a new and useful Improvement in Covers for Milk-Cans, of which the following is a full, clear, and exact description.

This invention relates to the peculiar construction and arrangement of the cover for milk-cans, whereby the animal heat and impure air may escape therefrom and a constant circulation of pure air introduced and maintained within the can, the cover being of such shape with reference to the ventilating-tubes that there is no place within the cover where heated air from the milk may accumulate and remain, and which cover, with its attachments, may be removed from the can simultaneously for the introduction of milk or cleansing, as hereinafter described.

Reference is to be had to the accompanying drawings, forming part of this specification, in which similar letters of reference indicate corresponding parts in all the figures.

Figure 1 represents a vertical central section of a cover for a milk-can with my improvements applied thereto; Fig. 2, a plan thereof; and Fig. 3 a view of the cover inverted, showing the removable screen and a bar or handle for disengaging and removing it from and replacing it within the cover.

The can itself is omitted in the accompanying drawings, as it forms no part of my invention and not deemed necessary in this application.

A in the annexed drawings represents the cover of a milk-can of the usual form, being a flat convex at the top, with its sides extending a distance downward and within the body of the can to retain it in position, as shown in Fig. 1.

In order to render this cover self-ventilating, to cool and preserve the milk in the can, two ventilating-tubes, B, are secured to and extend upward from the opposite sides of the exterior of the top of this convex cover, and, connecting with the interior of the can by means of corresponding openings through the top, create and maintain a constant circulation of pure air within the body of the can, the two tubes serving as chimneys to create a draft and carry off the impurities, and for the introduction of fresh air therein.

To prevent the milk from splashing up into the cover and through the ventilating-tubes B, and to exclude any matter that might find its way into the milk through these ventilating-tubes, an adjustable and removable screen or finely-perforated plate, D, is provided and placed within the cover, as represented in Fig. 1. This screen D is mounted in a section of a tube, E, fitted snugly to the inner surface of the sides of the cover and secured thereto in any convenient manner. To the lower side of this section E is attached a cross-bar, F, which serves as a handle by which to remove the section E and screen D, secured thereto, simultaneously from the cover for cleansing or repairs.

In view of the state of the art, I do not claim, broadly, a milk-can cover having ventilating-tubes therein, nor do I claim a screen to exclude foreign matter from the milk; but What I do claim as new, and desire to secure by Letters Patent, is—

In a milk-can cover, the combination of the conical ventilating-tubes B, secured to and extending upwardly from the outside of the convex cover A, the removable screen D, ring E, and cross-bar F, constructed and arranged substantially as described.

DANIEL F. CRIPPEN.

Witnesses:
JAMES P. GREVES,
W. W. NOLAND.